United States Patent
Rappaport

(10) Patent No.: US 10,794,984 B2
(45) Date of Patent: Oct. 6, 2020

(54) SYSTEM, METHOD AND COMPUTER-READABLE MEDIUM FOR ESTIMATING DIRECTION OF ARRIVAL OF A SIGNAL INCIDENT ON AT LEAST ONE ANTENNA ARRAY

(71) Applicant: New York University, New York, NY (US)

(72) Inventor: Theodore S. Rappaport, Riner, VA (US)

(73) Assignee: New York University, New York, NY (US)

( * ) Notice: Subject to any disclaimer, the term of this patent is extended or adjusted under 35 U.S.C. 154(b) by 213 days.

(21) Appl. No.: 14/891,837

(22) PCT Filed: May 21, 2014

(86) PCT No.: PCT/US2014/039007
§ 371 (c)(1),
(2) Date: Nov. 17, 2015

(87) PCT Pub. No.: WO2014/190074
PCT Pub. Date: Nov. 27, 2014

(65) Prior Publication Data
US 2016/0103199 A1    Apr. 14, 2016

Related U.S. Application Data

(60) Provisional application No. 61/826,406, filed on May 22, 2013.

(51) Int. Cl.
*G01S 3/42* (2006.01)
*G01S 3/48* (2006.01)
*H01Q 3/26* (2006.01)

(52) U.S. Cl.
CPC .................. *G01S 3/42* (2013.01);
*G01S 3/48* (2013.01); *H01Q 3/2605* (2013.01)

(58) Field of Classification Search
CPC ..... G01S 3/42; G01S 3/48; G01S 3/74; G01S 3/143; H01Q 3/2605
(Continued)

(56) References Cited

U.S. PATENT DOCUMENTS

2004/0014432 A1* 1/2004 Boyle ................. H04B 7/0617
455/101
2008/0150804 A1* 6/2008 Kalliola .................... G01S 3/74
342/443

(Continued)

OTHER PUBLICATIONS

International Search Report for International Application No. PCT/US2014/039007 dated Sep. 24, 2014.
(Continued)

*Primary Examiner* — Bernarr E Gregory
*Assistant Examiner* — Nuzhat Pervin
(74) *Attorney, Agent, or Firm* — Hunton Andrews Kurth LLP

(57) ABSTRACT

Exemplary embodiments include a computer-implemented method for configuring at least one antenna array comprising receiving a plurality of samples corresponding to signals incident on a plurality of antennas; using a computer arrangement, computing one or more data related to an envelope of the samples and estimating a direction of arrival of the signals incident on the antennas based on the one or more computed data; and configuring the at least one antenna array based on the estimated direction of arrival. The computing and estimating procedures can be performed for each of a plurality of direction-of-arrival candidates. The one or more data can be statistics corresponding to multipath shape factor parameters. The spatial selectivity of the at least one antenna array can be configured based on the estimated (Continued)

direction of arrival. Other exemplary embodiments include apparatus and computer-readable media embodying one or more of the exemplary computer-implemented methods and/or procedures.

22 Claims, 3 Drawing Sheets

(58) Field of Classification Search
USPC .......................................................... 342/377
See application file for complete search history.

(56) References Cited

U.S. PATENT DOCUMENTS

| | | | | |
|---|---|---|---|---|
| 2008/0158058 | A1* | 7/2008 | Struckman | G01S 3/74 342/378 |
| 2009/0128397 | A1* | 5/2009 | Owens | G01S 3/143 342/147 |
| 2011/0113082 | A1* | 5/2011 | Alimohammad | H03H 17/0292 708/316 |
| 2012/0009942 | A1* | 1/2012 | Zoubir | H04B 7/086 455/456.1 |
| 2014/0062793 | A1* | 3/2014 | AlSindi | G01S 5/0215 342/458 |

OTHER PUBLICATIONS

International Written Opinion for International Application No. PCT/US2014/039007 dated Sep. 24, 2014.

Durgin and T.S. Rappaport "Theory of Multipath Shape Factors for Small-scale Fading Wireless Channels", IEEE Transactions on Antennas and propagation, vol. 48, No. 5 (2000).

Durgin and T.S. Rappaport "Basic Relationship between Multipath Angular Spread and Narrowband Fading in Wireless Channels", IEE Electronics Letters, vol. 34, No. 25 (1998).

Durgin and T.S. Rappaport "Effect of Multipath Angular Spread on the Spatial . . . Envelopes", Proc. 49th IEEE Vehicular Technology Conf (VTC), vol. 2, pp. 996-1000, (1999).

Durgin and T.S. Rappaport "Level Crossing Rates and Average Fade Duration of Wireless Channels with Spatially Complicated Multipath", Proc. Globecom'99, (1999).

J. Lu and Y. Han, "Application of Multipath Shape Factors in Nakagami-m Fading Channel", Proc. Int'l Conf. Wireless Communications & Signal Processing, 2009.

* cited by examiner

SYSTEM, METHOD AND COMPUTER-READABLE MEDIUM FOR ESTIMATING DIRECTION OF ARRIVAL OF A SIGNAL INCIDENT ON AT LEAST ONE ANTENNA ARRAY

CROSS-REFERENCE TO RELATED APPLICATION

The present application relates to and claims the benefit and priority from International Patent Application No. PCT/US2014/039007 filed on May 21, 2014, which relates to U.S. Provisional Application Ser. No. 61/826,406 filed May 22, 2013, the entire disclosures of which are incorporated herein by reference.

FIELD OF THE DISCLOSURE

The present application relates to generally to the field of wireless communication systems, and more specifically to improving the performance of wireless communication receivers utilizing adaptive arrays of antenna elements (e.g., an M-by-N antenna array, where $M \geq 1$ and $N > 1$) by estimating the direction of arrival of signals incident on the adaptive array.

BACKGROUND INFORMATION

Wireless communication has evolved rapidly in the past decades as the demand for higher data rates and better quality of service has been continually required by a growing number of end users. Next-generation systems are expected to operate at higher frequencies millimeter-wavelength or "mmW") such as 5-300 GHz. Such systems are also expected to utilize a variety of multi-antenna technology (e.g., antenna arrays) at the transmitter, the receiver, or both. In the field of wireless communications, multi-antenna technology can comprise a plurality of antennas in combination with advanced signal processing techniques (e.g., beamforming). Multi-antenna technology can be used to improve various aspects of a communication system, including system capacity (e.g., more users per unit bandwidth, per unit area), coverage (e.g., larger area for given bandwidth and number of users), and increased per-user data rate (e.g., in a given bandwidth and area). Directive antennas can also ensure better wireless links as a mobile or fixed devices experiences a time varying channel.

In order to achieve many of these exemplary performance improvements, however, multi-antenna systems generally require an accurate and timely knowledge of the channel(s) between each of the transmit antennas and each of the receive antennas. The complexity and system overhead required to provide and obtain this channel information increases in proportion to both the operating frequency of the system and the number of antennas in the transmitting and/or receiving antenna arrays.

Thus, it can be beneficial to address at least some of the issues and problems identified herein above.

SUMMARY OF EXEMPLARY EMBODIMENTS

Accordingly, to address at least some of such issues and/or problems, certain exemplary embodiments of methods, systems, devices, and computer-readable media of the present disclosure can utilize a simple and accurate procedure to determine and/or follow the directions of arrival of multipath components in a signal incident on an antenna array. For example, exemplary embodiments of methods, systems, devices, and computer-readable media of the present disclosure can vastly out-perform conventional methods, techniques and systems in various known applications, including exemplary applications discussed herein.

In certain exemplary embodiments of the present disclosure, it is possible to provide a computer-implemented method for configuring at least one antenna array. For example, with such method, it is possible to receive a plurality of samples corresponding to signals incident on each of a plurality of antennas. Then, one or more data related to the envelope of the samples can be determined and/or computed; a direction of arrival of the signals incident on the plurality of antennas can be estimated based on the computed data; and the at least one antenna array can be configured based on the estimated direction of arrival. In some exemplary embodiments, the computing and estimating procedures can be performed for each of a plurality of direction-of-arrival candidates. In some exemplary embodiments, the one or more data can be statistics corresponding to multipath shape factor parameters. In some exemplary embodiments, the spatial selectivity of the at least one antenna array can be configured based on the estimated direction of arrival. According to further exemplary embodiments of the present disclosure, it is also possible to provide apparatus and computer-readable media embodying one or more of the exemplary computer-implemented methods and/or procedures.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which.

Figure 1:
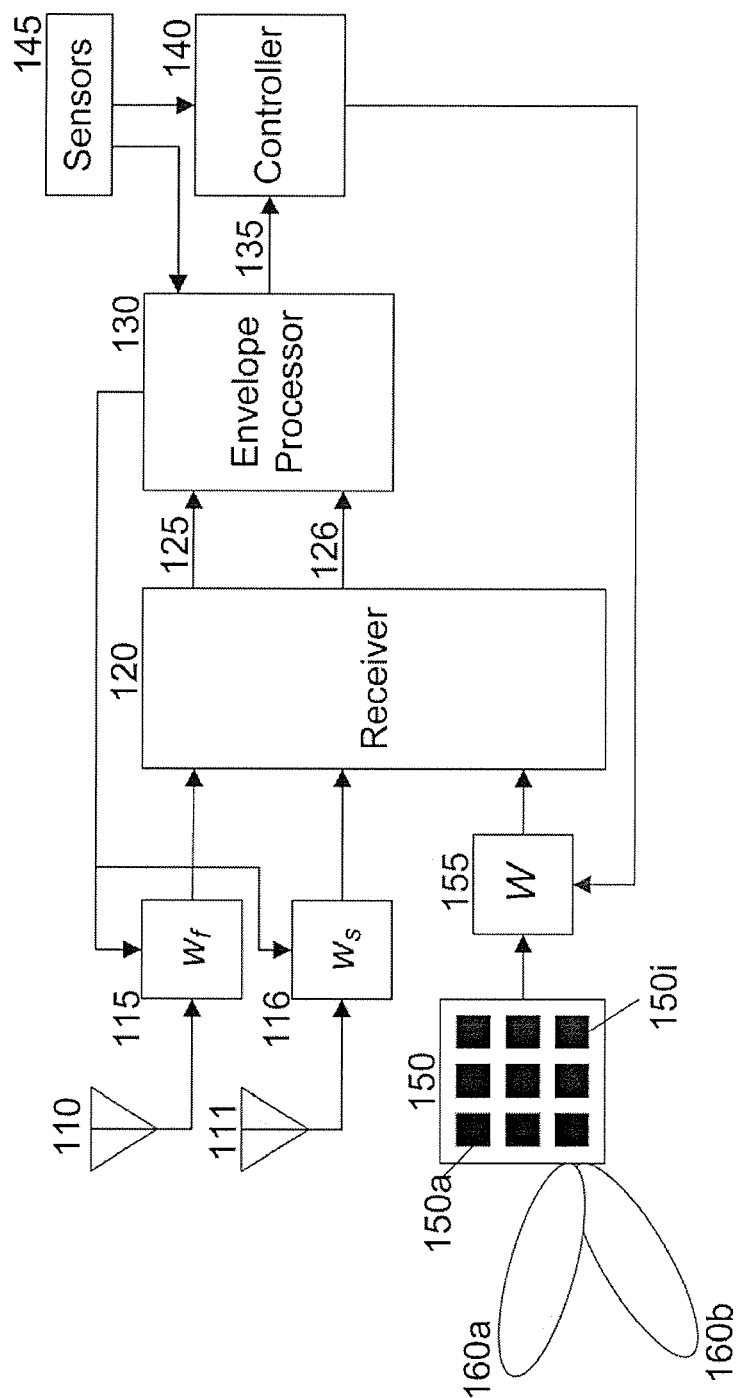
FIG. 1 is a block diagram of an exemplary apparatus and/or device according to one or more exemplary embodiments of the present disclosure.

While the present disclosure will now be described in detail with reference to the figures, it is done so in connection with the illustrative embodiments and is not limited by the particular embodiments illustrated in the figure(s) or in the appended claims.

DETAILED DESCRIPTION OF EXEMPLARY EMBODIMENTS

One of important characteristics of any multi-antenna configuration can be a distance between the different antenna elements due to the relation between the antenna distance and the mutual correlation between the radio-channel fading experienced by the signals at the different antennas. In general, the mutual correlation can be proportional to the relative spacing between the antennas. This spacing or distance can be often expressed in terms of the wavelength, λ, of the radio signal to be transmitted and/or received (e.g., λ/4 spacing). Another way to achieve low mutual fading correlation can be to apply different polarization directions for the different antennas. By using different polarization directions, the antennas can be located relatively close to each other in a compact array while still experiencing low mutual fading correlation.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g. a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In various wireless communication systems, such as cellular systems, there can be fewer constraints on the complexity of the base station compared to the terminal or mobile unit. In such exemplary case, transmit diversity may be feasible in the downlink (i.e., base station to terminal) only and, in fact, may provide a means to simplify the receiver in the terminal. In the uplink (i.e., terminal to base station) direction, due to a complexity of multiple transmit antennas, it may be preferable to achieve diversity by using a single transmit antenna in the terminal multiple receive antennas at the base station.

In other exemplary embodiments, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other exemplary embodiments, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further, improving the SINR provides limited increases in capacity. In such cases, using multiple antennas at both the transmitter and receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example; under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

In order to achieve these performance gains, MIMO generally provides that both the transmitter and receiver have knowledge of the channel from each transmit antenna to each receive antenna. In some exemplary embodiments, this can be done by the receiver measuring the amplitude and phase of a known transmitted data symbol (e.g., a pilot symbol) and sending these measurements to the transmitter as "channel state information" (CSI). CSI may include, for example, amplitude and/or phase of the channel at one or more frequencies, amplitude and/or phase of time-domain multipath components of the signal via the channel, direction of arrival of multipath components of the signal via the channel, and other metrics known by persons of ordinary skill. As used herein, "multipath component" can describe any resolvable signal component arriving at a receiver or incident on an antenna array at the receiver. The multipath component can be processed by the receiver at the radio frequency (RF), after conversion to an intermediate frequency (IF), or after conversion to baseband (i.e., zero or near-zero frequency). A plurality of the multipath components can comprise a main component of a transmitted signal received via a primary, direct, or near-direct path from the transmitter to the receiver, as well as one or more secondary components of the transmitted signal received via one or more secondary paths involving reflection, diffraction, scattering, delay, attenuation, and/or phase shift of the transmitted signal. Persons of ordinary skill can recognize that the number and characteristics of the multipath components available to be processed by a receiver can depend on various factors including, e.g., transmit and receive antennas, channel and/or propagation characteristics, transmission frequencies, signal bandwidths, etc.

In the case of a transmit array comprising $N_T$ antennas and a receive array comprising $N_R$ antennas, the receiver can be used to send CSI for $N_T \cdot N_R$ channels to the transmitter. Moreover, in mobile communication environments, these $N_T \cdot N_R$ channels are likely not stationary but vary according to the relative motion between the transmitter and the receiver (e.g., base station and terminal). The rate of change of the channel—and thus the preferable CST update rate—can be proportional to the relative velocity between the transmitter and the receiver, and the carrier frequency of the signal being transmitted. Further mobile communication systems—including so-called "fifth-generation" or "5G" systems—can utilize mmW frequencies in the 5-300 GHz spectrum, which are substantially higher than the 1-5 GHz spectrum used by today's systems. In addition, increasing the numbers antennas (i.e., $N_T$ and/or $N_R$) is expected to be an important technique for achieving performance goals for 5G systems including high data rates. In fact, as such mmW systems evolve, both the base stations and terminals could potentially utilize a multitude of antenna elements each, with the actual number of elements limited only by the physical area or volume available in each particular application.

The combination of these and other factors, however, can cause the CSI reporting overhead in 5G systems to be prohibitively expensive in terms of performance and/or capacity. What is needed is a simple and accurate method to determine and/or follow the directions of arrival of multipath components in a signal incident on a receiver antenna array. Exemplary embodiments of the present disclosure include computer-implemented methods for configuring at least one antenna array, which can include, e.g., receiving a plurality of samples corresponding to signals incident on each of a plurality of antennas; computing one or more data related to the envelope of the samples; estimating a direction of arrival of the signals incident on the plurality of antennas based on the computed data; and configuring the at least one antenna array based on the estimated direction of arrival. In some exemplary embodiments, the computing and estimating procedures can be performed for each of a plurality of direction-of-arrival candidates. In some exemplary embodiments, the data can comprise statistics corresponding to multipath shape factor parameters. In some exemplary embodiments the one or more data computed for each direction-of-arrival candidate comprise a cross-correlation between the envelopes of the respective sets of the samples corresponding to the signals incident on each of the antennas. In some exemplary embodiments, the determining procedure comprises determining a minimum value of the cross-correlation between the envelopes, and determining a direction of arrival that corresponds to the minimum value. In other exemplary embodiments, the determining procedure can comprise determining a maximum value of the cross-correlation between the envelopes, and determining a direction of arrival that corresponds to the maximum value in some exemplary embodiments, the spatial selectivity of the antenna array can be configured based on the estimated direction of arrival. In some exemplary embodiments, the antenna array can comprise one or more of the antennas. Exemplary embodiments also include apparatus and computer-readable media embodying one or more of the exemplary computer-implemented methods and/or procedures.

The multipath shape factor theory is described by G D. Durgin and T S. Rappaport in "Theory of Multipath Shape Factors for Small-scale Fading Wireless Channels", *IEEE Transactions on Antennas and propagation*, Vol. 48, No. 5 (May 2000), pp. 682-93 (incorporated herein by reference). Multipath shape factor theory provides a simple approach to quantitatively analyze any spatial distribution of non-omnidirectional multipath waves in a local area. Under this theory, the following three shape factors—angular spread $\Lambda$, angular constriction $\gamma$, and azimuthal direction of maximum fading $\theta_{max}$—are derived using low-order Fourier analysis of angular multipath power distribution $p(\theta)$ according to:

$$\Lambda = \sqrt{1 - \frac{|F_1|^2}{F_0^2}} \quad (1)$$

$$\gamma = \frac{|F_0 F_2 - F_1^2|}{F_0^2 - |F_1|^2} \quad (2)$$

$$\theta_{max} = \frac{1}{2}\arg(F_2 F_0 - F_1^2), \quad (3)$$

$$\text{where } F_n = \int_0^{2\pi} p(\theta)\exp(jn\theta)\,d\theta. \quad (4)$$

The angular spread $\Lambda$, ranging from zero to one, describes how the multipath components concentrate about a single azimuthal direction. When $\Lambda$ is equal to zero, the multipath components arrive from one single direction, and when $\Lambda$ is equal to one, there is no clear bias in the angular distribution of received power. The angular constriction $\gamma$, also ranging from zero to one, describes how multipath components concentrate about two azimuthal directions. With $\gamma$ equal to zero, multipath components show no clear bias in two arrival directions, and when $\gamma$ is equal to one, multipath components arrive from only two azimuthal directions. The azimuthal direction of maximum fading $\theta_{max}$ represents the angle of arrival of incident waves at which maximum fading occurs (i.e., maximum rate of change in amplitude).

Various second-order small scale fading statistics (e.g., level crossing rate, average fade duration, spatial cross-correlation of received voltage envelope and coherence distance) can be derived using the three multipath shape factors described in (1)-(4) above. These statistics have been proved to be approximately accurate under Rayleigh fading conditions not only in the paper cited above, but also in other publications by Durgin and Rappaport including, e.g.: "Basic Relationship between Multipath Angular Spread and Narrowband Fading in Wireless Channels", *IEE Electronics Letters*, Vol. 34, No. 25 (December 1998), pp. 2431-32; "Effect of Multipath Angular Spread on the Spatial Cross-correlation of the Received Voltage Envelopes", *Proc. 49th IEEE Vehicular Technology Conference (VTC)*, Vol. 2, pp. 996-1000, May 1999; and "Level Crossing Rates and Average Fade Duration of Wireless Channels with Spatially Complicated Multipath", *Proc. Globecom '99*, December 1999.

An assumption of a Rayleigh fading channel can be valid for low-cost, omnidirectional antennas that could be used in parallel to receive a narrowband signal (e.g., a pilot signal or symbol) at mmW frequencies. Even so, the multipath shape factor model can be used to represent other realistic channels based on measurements and realistic antennas. See, e.g., T. Lu, Y. Han, "Application of Multipath Shape Factors in Nakagami-m Fading Channel", *Proc. Intl Conf. Wireless Communications & Signal Processing*, 2009 (also incorporated herein by reference), The fading statistics of narrowband envelope measurements may be determined using simple multipath shape factors. Analytical methods can be used to resolve the accurate relationships between the directions at which multipath waves come from, and the envelope fading statistics that give rise to multipath shape factors. Various exemplary fading statistics can be employed for these purposes including, but not limited to, level crossing rate, average fade duration, coherence distance, spatial cross-correlation of received voltage envelope, etc.

Among the above-mentioned exemplary fading statistics, the spatial cross-correlation of the received voltage envelope across two nearby, omni-directional antennas is a parameter that can be easily extracted in realistic transmissions. The spatial cross-correlation of the received voltage envelope can also contain information that can be used to describe the directions at which multipath waves come from. Moreover, the spatial cross-correlation can be defined in terms of the multipath shape factors $\Lambda$, $\gamma$ and $\theta_{max}$ as:

$$\rho(r,\theta) \approx \exp\{-23\Lambda^2(1+\gamma \cos[2(\theta-\theta_{max})])(r/\lambda)^2\} \quad (5)$$

where r is the distance between two points along an azimuthal direction $\theta$.

Figure 4:
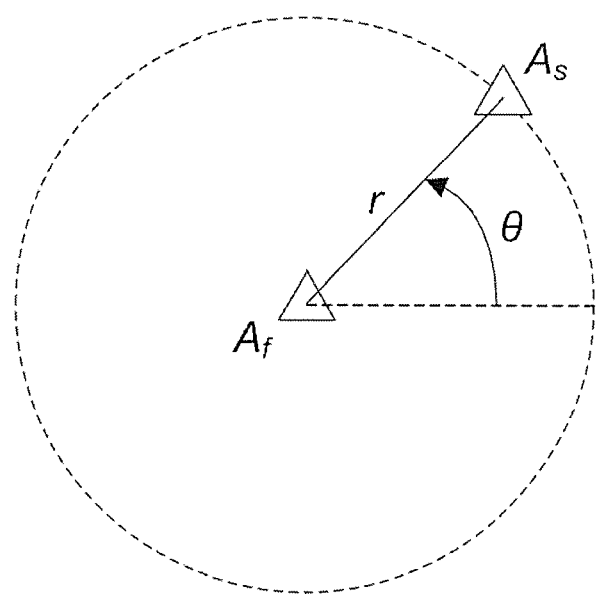
FIG. 4 is a diagram of an exemplary spatial relationship between two antennas and a reference direction, such as a direction of motion.

FIG. 4 illustrates an exemplary relationship between two antennas $A_f$ and $A_s$ spaced a distance r apart and having an azimuthal direction oriented at an angle $\theta$ relative to a reference direction (e.g., a direction of motion). As discussed herein below, for a constant antenna spacing r=c, the values of $\rho(c, \theta)$ (hereinafter called $\rho(\theta)$) can be estimated for a range of $\theta$ based on samples of the received voltage envelope (e.g., for a pilot signal or symbol). Moreover, based on these estimated values of $\rho(\theta)$, one or more of the multipath shape factors $\Lambda$, $\gamma$ and $\theta_{max}$ can be determined and/or computed and used to estimate the direction of arrival of the multipath components incident on the omnidirectional antennas.

Multipath shape factor theory indicates that it may be possible to blindly or rapidly detect the arrival directions of energy by signal processing through the observation of statistics, or the observation of signal combinations, such as correlations, or peak and average signal levels between different antenna elements. For example, in multipath shape factor theory, a value or $\Lambda=1$ indicates energy is arriving from just one direction denoted by $\theta$.

FIG. 1 shows a block diagram of an exemplary apparatus and/or device according to one or more embodiments of the present disclosure. The apparatus and/or device of FIG. 1 can include two or more antennas—a first antenna ($A_f$) 110 and a second antenna ($A_s$) 111. Each of the antennas 110 and 111 can have various antenna beam patterns. In some exemplary embodiments, each of antennas 110 and 111 can provide an omnidirectional pattern. In other exemplary embodiments of the present disclosure, it is possible that the patterns of antennas 110 and 111 may not be truly omnidirectional, although may be have a broader beam width than a typical phased array or horn antenna. For example, the antennas 110 and 111 can have less directionality (e.g., a wider beam pattern providing capability to receive signals from a wider range of azimuth angles and/or elevation angles) than antenna array 150 described herein below. In other exemplary embodiments of the present disclosure, the antennas 110 and 111 can be sectored antennas operating cooperatively to provide characteristics of an omnidirectional antenna (e.g., a "pseudo-omnidirectional antenna") or, more generally, of a single antenna having a less spatially selective beam pattern than the individual beam patterns of either antenna 110 or antenna 111.

In various exemplary embodiments, each of the antennas 110 and 111 may take various physical forms including, e.g., dipole, patch, cross dipole, inverted F, inverted L, helix, Yagi, rhombic, lens, and/or any another type of antenna topology known to persons of ordinary skill. Each of antennas 110 and 111 can utilize various polarization patterns known to persons of ordinary skill, including horizontal, vertical, circular, and cross polarization. In some exemplary embodiments, each of the antennas 110 and 111 can be designed especially for the particular operating frequency (e.g., 20 GHz) and device in which the exemplary apparatus shown in FIG. 1 can be used, e.g., a mobile terminal, cell phone, handset, laptop, tablet, access point, base station, etc.

For example, at mmW frequencies above 10-20 GHz, the antenna elements can be implemented on a small, high-dielectric substrate or package (e.g., in a mobile device) or may be implemented as a panel antennas (e.g., in or connected to an access point or a base station). Moreover, in various exemplary embodiments, the antenna elements can be implemented on circuit boards or within chips. Although the receiver of FIG. 1 is shown with the two antennas 110 and 111, this number is merely exemplary and can be extended according to the requirements and constraints of each individual embodiment and/or application.

The exemplary apparatus shown in FIG. 1 can also include an antenna array 150 that comprises a plurality of individual antenna elements arranged in a particular pattern, such as, e.g., exemplary antenna elements 150a to 150i arranged in an exemplary 3-by-3 grid. In some exemplary embodiments, the antenna array 150 can be arranged as an M-by-N array of elements, where M≥1 and N>1. In some exemplary embodiments, the antenna elements 150a to 150i can be arranged in a rectangular grid with equal spacing in one or both dimensions; however, other exemplary arrangements of the elements comprising the array are possible. In addition, each element of the antenna array 150 can have various physical forms including dipole, patch, cross dipole, inverted F, inverted L, helix, Yagi, rhombic, lens, and/or any another type of antenna topology known to persons of ordinary skill. Elements 150a to 150i can utilize various polarization patterns known to persons of ordinary skill, including horizontal, vertical, circular, and cross polarization.

In some exemplary embodiments, elements 150a to 150i—as well as their arrangement in the array 150—can be designed especially for the particular operating frequency (e.g., 5 GHz, 10 GHz, 300 GHz, etc.) and device (e.g., a mobile terminal, cell phone, handset, laptop, tablet, access point, base station, etc.) in which the exemplary apparatus of FIG. 1 can be used. e.g. In some exemplary embodiments, one or more of elements 150a to 150i of array 150 may have beam patterns that are more spatially selective than the beam patterns of either or both of antennas 110 and 171. Furthermore, although the antenna array 150 and the antennas 110 and 111 are shown as separate entities in FIG. 1, in some exemplary embodiments, the antenna array 150 can comprise either or both of the antennas 110 and 111. For example, array elements 150a and 150b can comprise antennas 110 and 111, respectively. More generally, since the apparatus of FIG. 1 may comprise a plurality of antennas (e.g., antennas 110 and 111), as described above, the array 150 may comprise any portion or percentage of the plurality of antennas, including 0% and 100%. Furthermore, the portion or percentage need not remained fixed but can be changed as necessary over time.

The exemplary apparatus shown in FIG. 1 can further comprise amplifiers 115 and 116 that can apply selectable weighting factors $w_f$ and $w_s$ to the signals received by the antennas 110 and 111, respectively. In the exemplary embodiment of the system/device arrangement shown in FIG. 1, an envelope processor 130 can select the weighting factors $w_f$ and $w_s$, and can program the amplifiers 115 and 116 to apply these weighting factors. By selecting and applying the proper gain and phase values for $w_f$ and $w_s$, the output of amplifiers 115 and 116 can be combined to create and/or generate a beam for the antennas 110 and 111 that can be electrically steerable to capture signals that are incident from one or more ranges of azimuth and/or elevation angles that are centered around a particular direction of arrival, $\theta$. The output signals from the amplifiers 115 and 116 can be input to the receiver 120, which process the signals to output complex voltage signals 125 and 126, corresponding to the signals received by antennas 110 and 111, respectively. In some exemplary embodiments, complex voltage signals 125 and 126 correspond to signals received by antennas 110 and 111, respectively, at substantially the same time.

An exemplary receiver 120 can comprise components such as, e.g., amplifiers, duplexers, diplexers, filters, mixers, samplers, digitizers, correlators, Fast Fourier Transformers (FFTs), etc. that process the inputs from the amplifiers 115 and 116 in various ways known to persons of ordinary skill depending on the structure of the received signals. In some exemplary embodiments, the receiver 120 can convert the inputs from the amplifiers 115 and 116 to baseband, sample and/or digitize them into a digital format, extract a data symbol (e.g., "pilot symbol") having one or more expected parameters (e.g., frequency, phase, timing, amplitude, etc.), and compare the extracted data symbol to its expected parameters to determine the difference (e.g., attenuation and/or phase shift) caused by the channel between the transmit antenna and the receive antenna 110 (or receive antenna 111, as the case may be). This exemplary procedure of converting the symbol to baseband can be performed in various exemplary ways, including the use of correlation (e.g., for single- or multi-carrier CDMA-based systems) and/or FFT (e.g., for OFDM-based or SC-FDE-type systems).

The complex voltage signals 125 and 126 can be output from the receiver 120 to the envelope processor 130, which can collect a plurality of samples of complex voltage signals 125 and 126 for a particular direction of arrival, θ, over a duration of time. Moreover, the envelope processor 130 can collect samples for a plurality of values of θ by selecting and applying gain and phase values for $w_f$ and $w_s$ that correspond to each particular value of θ. Each of these samples can correspond, for example, to a particular pilot symbol in the received signals. Moreover, the envelope processor 130 can determine or compute a variety of data (e.g., statistics) using signals 125 and 126 and further use such exemplary data to determine and/or compute various parameters related to an estimated direction of arrival.

In some exemplary embodiments of the present disclosure, the envelope processor 130 can further determine the statistical envelope cross-correlation between the respective samples of the complex voltage signals 125 and 126 according to the following:

$$\rho(\theta) = \frac{\sum_{i=1}^{imax}(m_f(i) - \overline{m_f}) * (m_s(i) - \overline{m_s})}{\sqrt{\sum_{i=1}^{imax}(m_f(i) - \overline{m_f})^2 * \sum_{i=1}^{imax}(m_s(i) - \overline{m_s})^2}}, \quad (6)$$

where θ represents the azimuthal orientation between the antennas 110 and 111, $i_{max}$ is the number of samples of each complex voltage signal 125 and 126 at orientation θ, $m_f(i)$ represents the envelope (i.e., absolute value) of the $i^{th}$ sample of the complex voltage signal 125 corresponding to antenna 110, $m_s(i)$ represents the envelope of the $i^{th}$ sample of complex voltage signal 126 corresponding to the antenna 111, and $\overline{m_f}$ and $\overline{m_s}$ represent the average envelope values from the antennas 110 and 111, respectively, over the $i_{max}$ samples. Although equation (6) illustrates ρ(θ) estimated using average-adjusted samples $m_f(i)$ and $m_s(i)$, non-average-adjusted samples can be used for estimating ρ(θ) in other exemplary embodiments.

The envelope processor 130 can determine and/or compute ρ(θ) for a variety of values of θ over a range of interest from $\theta_{start}$ to $\theta_{end}$. The envelope processor 130 can then determine a direction-of-arrival estimate 135 based on these values of ρ(θ) In some embodiments, the envelope processor 130 can estimate the direction of arrival by selecting, computing, or otherwise determining a minimum value of ρ(θ) over the range of interest from $\theta_{start}$ to $\theta_{end}$ then determining the angle $\theta_{max}$ that corresponds to the minimum ρ(θ). In other exemplary embodiments, the envelope processor 130 can estimate the direction of arrival by selecting, computing, or otherwise determining a maximum value of ρ(θ) over the range of interest from $\theta_{start}$ to $\theta_{end}$ then determining the angle $\theta_{max}$ that corresponds to the maximum ρ(θ). In other embodiments in which the envelope processor 130 computes data (e.g., statistics) other than or in addition to ρ(θ), the envelope processor 130 can compute various values (e.g., combination of minima and/or maxima) based on these data and determine a direction of arrival estimate based on these various computed values.

The envelope processor 130 can then output this estimated exemplary angle $\theta_{max}$ to the controller 140 as the direction-of-arrival estimate 135, in further exemplary embodiments of the present disclosure, the controller 140 can utilize the direction-of-arrival estimate 135 to determine appropriate weights, W, to cause the antenna array 150 to produce one or more beam patterns corresponding to the estimated direction of arrival. For example, as shown in FIG. 1, by applying the appropriate weights, W, to the signals received from the antenna elements 150a through 150i, the antenna array 150 may capture signals and/or multipath components that are incident in the directions of arrival corresponding to beams 160a and 160b while rejecting signals and/or multipath components that are incident other directions of arrival, Controller 140 can program beamformer 155 with weights, W, corresponding to the estimated direction of arrival. Controller 140 can determine weights W using various beam-steering or beam-forming algorithms know to persons of ordinary skill, including parametric algorithms and codebook-based algorithms. In various exemplary embodiments, the beamformer 155 can comprise one or more programmable amplifiers that modifies the amplitude and/or phase of the signals (e.g., at RF or IF) from the array elements 150a through 150i, while in other exemplary embodiments, the beamformer 155 can comprise a digital processor that modifies the signals from the array elements 150a through 150i after sampling and/or down-conversion to IF or baseband.

According to various exemplary embodiments in which the antenna array 150 comprises one or more of the plurality of antennas 110 and 111, various parameters corresponding to the dual-purpose antenna(s) can be adjusted or changed according to the particular use or function of the antenna(s) at any particular time. For example, different gains and/or phases may be applied to the signals received by antennas 110 and 111 according to whether they are being used for estimating a direction of arrival or receiving a desired signal together with other elements in array 150. In some embodiments, beamformer 155 can also comprise the functionality of amplifiers 115 and 116 that correspond to the dual-purpose antennas. For example, weights $w_f$ and $w_s$ can be applied to beamformer 155 when the antenna elements are being used for estimating a direction of arrival and different weights, W, can be applied to beamformer 155 when receiving a desired signal. In other exemplary embodiments, amplifiers 115 and 116 and beamformer 155 may be distinct and separate even if one or more antenna elements are used for both direction estimation and receiving a desired signal.

In various further exemplary embodiments, the controller 140 can comprise a general-purpose microprocessor, a special-purpose microprocessor, a digital signal processor (DSP), an application specific integrated circuit (ASIC), or other type of computer arrangement known to persons of ordinary skill in the art. Furthermore, the controller 140 can be programmable to perform the functions described herein by executable software code stored in an accessible memory or other type of computer-readable medium. In some exemplary embodiments, the memory or computer-readable medium can be permanently configured with such executable software code, while in other embodiments, the memory or computer-readable medium can be capable of having the executable software code downloaded and/or configured.

According to other exemplary embodiments, the exemplary apparatus shown in FIG. 1 can comprise or be associated with one or more sensors 145, such as, e.g., an orientation sensor, a position sensor, a directional velocity sensor, etc. The sensors 145 can be connected to and configurable by the controller 140 and/or the envelope processor 130, such that the information provided by the sensors 145 can be used by the controller 140 and/or the envelope processor 130 for estimating the direction-of-arrival 135 of signals and/or multipath components and/or adjusting the spatial selectivity of the antenna array 150 in accordance with the estimated direction of arrival as discussed above. As used herein, "spatial selectivity" refers to the ability to form one or more beams of an antenna array to receive signals incident from one or more desired ranges of azimuths and/or elevations, and to adequately attenuate and/or reject signals incident from other ranges of azimuths and/or elevations. For example, the controller 140 and/or the envelope processor 130 can use such information to determine the approximate direction in which the receiver is travelling and the approximate orientation of the antennas 110 and 111 (e.g., the face on which antennas are disposed) in relation to the approximate direction of travel.

Figure 2:
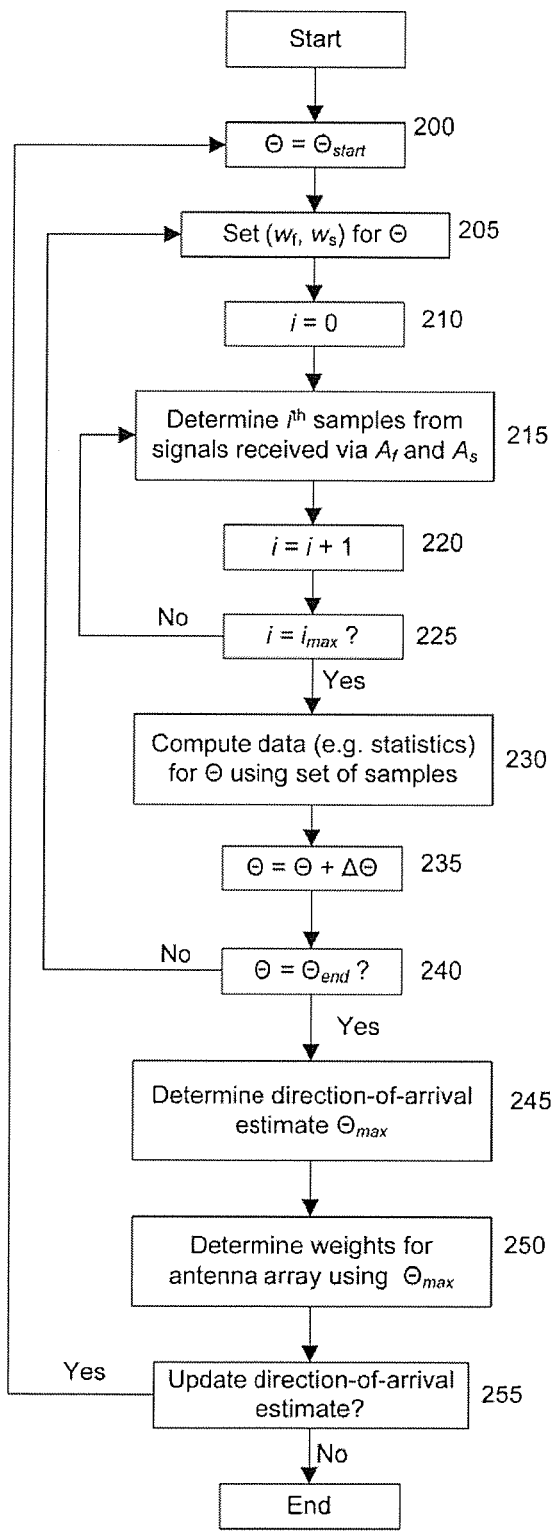
FIG. 2 is a flow diagram of an exemplary method for estimating the direction-of-arrival of an incident signal and adjusting the spatial selectivity of a receiver antenna array in accordance with the estimated direction of arrival according to one or more exemplary embodiments of the present disclosure.

FIG. 2 shows a flow diagram corresponding to an exemplary method for a receiver (e.g., in a terminal or a base station), according to one or more exemplary embodiments of the present disclosure, to estimate the direction-of-arrival of an incident signal and configure the spatial selectivity of an antenna array in accordance with the estimated direction of arrival according to one or more of exemplary embodiments of the present disclosure. Although the exemplary method is illustrated by blocks in the particular order shown in FIG. 2, this order is merely exemplary and the functions corresponding to the blocks may be performed in different orders and may be combined and/or divided into blocks having different functionality than shown in FIG. 2.

At the beginning, the exemplary method proceeds to block 200 where a direction-of-arrival candidate, θ, is initialized to the minimum value over the range of interest, $\theta_{start}$ to $\theta_{end}$. In block 205, gain/phase values $w_f$ and $w_s$ for antennas $A_f$ and $A_s$, respectively, can be determined based on the current direction-of-arrival candidate, θ. In some exemplary embodiments, the operations of block 205 can further comprise initializing an amplifier or a beamformer with $w_f$ and $w_s$. After the sample counter, i, is initialized to zero in block 210, the exemplary method enters the main inner loop. In block 215, signals received via $A_f$ and $A_s$ with $w_f$ and $w_s$ applied as calculated in block 205 are processed to determine the $i^{th}$ complex voltage sample corresponding to the current direction-of-arrival candidate, θ. As described herein above, the exemplary processing in block 215 can comprise converting the inputs to baseband, extracting a data symbol having an expected timing and/or frequency as well as an expected value (e.g., "pilot symbol"), and comparing the extracted data symbol to its expected value to determine the attenuation and/or phase shift caused by the channel between the transmit antenna(s) and receive antenna $A_f$ (or $A_s$, as the case may be). This exemplary of converting the symbol to baseband may be performed in various ways, including the use of correlation (e.g., for CDMA-based systems) and/or FFT (e.g., for OFDM-based systems). The sample counter i can then be incremented (in block 220) and checked to determine if it has reached $i_{max}$, the maximum number of samples for each direction-of-arrival candidate. If $i<i_{max}$, the exemplary method returns to block 215 for another pass through the inner loop.

Further, if $i=i_{max}$ the exemplary method proceeds to block 230, where one or more data (e.g., statistics) are computed using the $i_{max}$ samples corresponding to antennas $A_f$ and $A_s$ captured for current direction-of-arrival candidate, θ. In some exemplary embodiments, the operations of block 230 can comprise computing or otherwise determining the statistical envelope cross-correlation, ρ(θ), between the $i_{max}$ samples corresponding to each of antennas $A_f$ and $A_s$, as described herein above. The direction-of-arrival candidate, θ, can then be incremented by an amount Δθ (in block 235) and checked to determine if it has reached $\theta_{end}$, the end of the range of interest (in block 240). If $\theta<\theta_{end}$, the exemplary method returns to block 205 for another pass through the outer loop.

Further, if $\theta=\theta_{end}$, the exemplary method proceeds to block 245, where the direction-of-arrival estimate, $\theta_{max}$, is determined using the data computed in block 230 for each of the direction-of-arrival candidates between $\theta_{start}$ and $\theta_{end}$. In some exemplary embodiments, the operations of block 245 can comprise selecting the angle $\theta_{max}$ corresponding to the minimum of the statistical envelope cross-correlation, ρ(θ), over the range of interest from $\theta_{start}$ to $\theta_{end}$. In some exemplary embodiments, selecting the angle $\theta_{max}$ may comprise selecting one of the discrete direction-of-arrival candidates used in the previous blocks, as described above. In other exemplary embodiments, selecting the angle $\theta_{max}$ may comprise computing an angle that lies between two consecutive direction-of-arrival candidates.

The exemplary method then proceeds to block 250, where weights, W, for the antenna array can be determined using the direction-of-arrival estimate, $\theta_{max}$. These weights can be determined in various ways known to persons of ordinary skill in the art. According to certain exemplary embodiments, the operations of block 250 can further comprise configuring an amplifier or a beamformer operably connected to the antenna array with values corresponding to the weights, W. In some exemplary embodiments, configuring an amplifier or beamformer in this manner effectively configures the spatial selectively of the antenna array.

Subsequently, the exemplary method proceeds to block 255 where a determination is made whether to update the direction-of-arrival estimate $\theta_{max}$. This exemplary determination can be made based on various factors including, for example, the elapsed time since the most recent estimate, the velocity of the receiver relative to the transmitter, the frequency at which the system is operating, the quality of one or more previous estimates, and other factors known to persons of ordinary skill. If an update is required and/or preferred, the exemplary method returns to block 200; otherwise the method ends.

Although exemplary embodiments are described above in relation to estimating the direction of arrival $\theta_{max}$ of a signal comprising one or more multipath components without information from other sources (e.g., blindly), these and other exemplary embodiments can utilize feedback from the receiver to the transmitter. Such feedback can be used, for example, to improve the ability of either or both the transmitter and the receiver to form spatially selective beams and/or otherwise improve the performance of the wireless communications link. Such feedback can be used, for example, for communication from a base station to a mobile station (or vice versa) of for communication between two peer devices (e.g., peer-to-peer communications, ad hoc networking, etc.).

Although exemplary embodiments are described above in relation to estimating the direction of arrival $\theta_{max}$ of a signal comprising one or more multipath components originating from a single transmitter, other exemplary embodiments can estimate a plurality of directions of arrival $\theta_{max}(i)$, i=1 . . . N, each corresponding to a signal i originating from a different transmitter. For example, embodiments can estimate N directions of arrival of signals transmitted from N geographically dispersed mobile units. Furthermore, each of $\theta_{max}(i)$, i=1 . . . N can be used to initialize an amplifier or a beamformer with corresponding weights, W(i). For example, the N sets of weights, W(i), i=1 . . . N, may be applied to the amplifier or beamformer in a time-multiplexed fashion, with each set of weights W(i) being applied for a period of time necessary to receive the corresponding signal i. Similarly, reception of the N transmitted signals may be multiplexed (e.g., by control of receiver 120 and antennas 110, 111) when estimating the corresponding N directions of arrival $\theta_{max}(i)$. In other exemplary embodiments, various signal coding techniques may be employed to facilitate the simultaneous reception of at least a portion of the N signals by antenna array 150 and/or antennas 110, 111 In some exemplary embodiments, a ranked ordering of signal strengths per direction of arrival $\theta_{max}(i)$, i=1 . . . N may be readily determined and used for processing, combining, and/or selection by either or both the receiver and/or the transmitter, as the case may be.

Although exemplary embodiments have been described herein above in relation to wireless communications (e.g., cellular communications) between one or more transmitters and one or more receivers, the person of ordinary skill can recognize that various exemplary embodiments can be employed to determine angles of arrival and/or angles of departure angles in a wide variety of applications. For example, embodiments can be used in navigation systems to estimate angles of arrival that are necessary or helpful in determining direction, orientation, location, velocity, etc. of a non-stationary platform (e.g., a vehicle). Exemplary embodiments can also be utilized in channel sounding systems to characterize and/or determine radio wave propagation behavior of a transmission medium (e.g., a radio channel). Furthermore, exemplary embodiments can be used to detect the presence, existence, and/or location of sources of noise or other emissions (desired or undesired). Moreover, various exemplary embodiments can be used to perform one or more of the functions or applications described herein above concurrently or at various different points in time.

Figure 3:
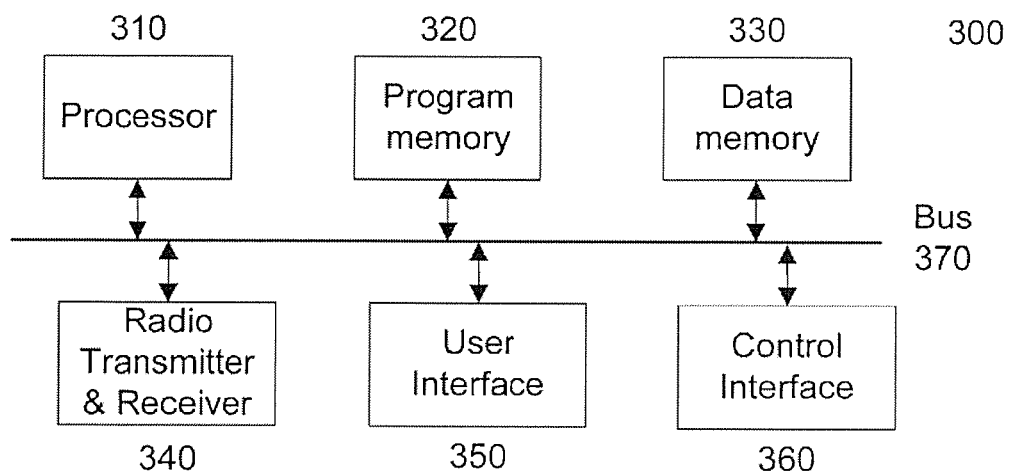
FIG. 3 is a block diagram of an exemplary device and/or apparatus, according to one or more embodiments of the present disclosure.

Although various embodiments are described herein above in terms of methods, apparatus, devices, computer-readable medium and receivers, the person of ordinary skill will readily comprehend that such methods may be embodied by various combinations of hardware and software in various systems, communication devices, computing devices, control devices, apparatuses, non-transitory computer-readable media, etc. FIG. 3 shows a block diagram of an exemplary device or apparatus utilizing certain exemplary embodiments of the present disclosure, including execution of instructions on a computer-readable medium comprising one or more exemplary methods for estimating the direction-of-arrival of an incident signal and/or adjusting the spatial selectivity of a receiver antenna array in accordance with the estimated direction of arrival according to one or more of the embodiments described herein above. Exemplary device 300 can comprise a processor 310 that can be operably connected to a program memory 320 and/or a data memory 330 via a bus 370 that can comprise parallel address and data buses, serial ports, or other methods and/or structures known to those of ordinary skill in the art. Program memory 320 comprises software code or program executed by processor 310 that facilitates, causes and/or programs exemplary device 300 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1xRTT, CDMA2000, 802.11 WiFi standards, HDMI, USB, Firewire, etc., or any other protocols known now or in the future that can be utilized in conjunction with radio transceiver 340, user interface 350, and/or host interface 360.

Program memory 320 can also comprises software code executed by processor 310 to control the functions of device 300, including configuring and controlling various components such as radio transceiver 340, user interface 350, and/or host interface 360. Program memory 320 may also comprise an application program for estimating the direction-of-arrival of an incident signal and/or adjusting the spatial selectivity of a receiver antenna array in accordance with the estimated direction of arrival, according to one or more of the embodiments described herein above. Such software code may be specified or written using any known or future developed programming language, such as e.g. Java, C++, C, Objective C, HTML, XHTML, machine code, and Assembler, as long as the desired functionality, e.g., as defined by the implemented method steps, is preserved. In, addition or alternately, program memory 320 can comprise an external storage arrangement (not shown) remote from device 300, from which, the instructions can be downloaded into program memory 320 located within or removably coupled to device 300, so as to enable execution of such instructions.

Data memory 330 can comprise memory area for processor 310 to store variables used in protocols, configuration, control, and other functions of device 300, including estimating the direction-of-arrival of an incident signal and/or adjusting the spatial selectivity of a receiver antenna array in accordance with the estimated direction of arrival, according to one or more of the embodiments described herein above. Moreover, program memory 320 and/or data memory 330 can comprise non-volatile memory (e.g., flash memory), volatile memory (e.g., static or dynamic RAM), or a combination thereof. Furthermore, data memory 330 can comprise a memory slot by which removable memory cards in one or more formats (e.g., SD Card, Memory Stick, Compact Flash, etc.) may be inserted and removed. Persons of ordinary skill in the art will recognize that processor 310 can comprise multiple individual processors (e.g., multi-core processors), each of which implements a portion of the functionality described above. In such case, multiple individual processors may be commonly connected to program memory 320 and data memory 330 or individually connected to multiple individual program memories and or data memories. More generally, persons of ordinary skill in the art will recognize that various protocols and other functions of device 300 may be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 340 can comprise radio-frequency transmitter and/or receiver functionality that facilitates the device 300 to communicate with other equipment supporting like wireless communication standards and/or protocols. In some exemplary embodiments, the radio transceiver 340 includes a transmitter and a receiver that enable device 300 to communicate with various Fifth-Generation (5G) networks according to various protocols and/or methods proposed for standardization by 3GPP and/or other standards bodies. In some exemplary embodiments, the radio transceiver 340 can comprise some or all of the functionality of the receiver shown in and described above with reference to FIG. 1.

In some exemplary embodiments, the radio transceiver 340 includes an LTE transmitter and receiver that can facilitate the device 300 to communicate with various Long Term Evolution (LTE) networks (also known as "4G") according to standards promulgated by 3GPP. In some exemplary embodiments of the present disclosure, the radio transceiver 340 includes circuitry, firmware, etc. necessary for the device 300 to communicate with various LTE, UMTS, and/or GSM/EDGE networks, also according to 3GPP standards. In some exemplary embodiments of the present disclosure, radio transceiver 340 includes circuitry, firmware, etc. necessary for the device 300 to communicate with various CDMA2000 networks, according to 3GPP2 standards. In some exemplary embodiments of the present disclosure, the radio transceiver 340 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, radio transceiver 340 can comprise a transceiver that is capable of wired communication, such as by using IEEE 802.3 Ethernet technology. The functionality particular to each of these embodiments may be coupled with or controlled by other circuitry in the device 300, such as the processor 310 executing protocol program code stored in program memory 320.

User interface 350 may take various forms depending on the particular embodiment of the device 300. In some exemplary embodiments of the present disclosure, the user interface 350 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 300 can comprise a tablet computing device (such as an iPad® sold by Apple, Inc.) including a larger touchscreen display. In such embodiments, one or more of the mechanical features of the user interface 350 may be replaced by comparable or functionally equivalent virtual user interface features (e.g., virtual keypad, virtual buttons, etc.) implemented using the touchscreen display, as familiar to persons of ordinary skill in the art. In other embodiments, the device 300 may be a digital computing device, such as a laptop computer, desktop computer, workstation, etc. that comprises a mechanical keyboard that may be integrated, detached, or detachable depending on the particular exemplary embodiment. Such a digital computing device may also comprise a touch screen display. Many exemplary embodiments of the device 300 having a touch screen display are capable of receiving user inputs, such as inputs related to determining a direction of arrival or configuring an antenna array, as described herein or otherwise known to persons of ordinary skill in the art.

In some exemplary embodiments of the present disclosure, device 300 can comprise an orientation sensor, which can be used in various ways by features and functions of device 300. For example, the device 300 can use outputs of the orientation sensor to determine when a user has changed the physical orientation of the device 300's touch screen display. An indication signal from the orientation sensor may be available to any application program executing on the device 300, such that an application program may change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure, as discussed in more detail above with reference to FIG. 1.

A control interface 360 of the device 300 can take various forms depending on the particular exemplary embodiment of device 300 and of the particular interface requirements of other devices that the device 300 is intended to communicate with and/or control. For example, the control interface 360 can comprise an RS-232 interface, an RS-485 interface, a USB interface, an HDMI interface, a Bluetooth interface, an IEEE 1394 ("Firewire") interface, an I$^2$C interface, a PCM-CIA interface, or the like. In some exemplary embodiments of the present disclosure, control interface 360 can comprise an IEEE 802.3 Ethernet interface such as described above. In some exemplary embodiments of the present disclosure, the control interface 360 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 300 can comprise more functionality than is shown in FIG. 3 including, for example, a video and/or still-image camera, microphone, media player and/or recorder, etc. Moreover, radio transceiver 340 may include circuitry necessary to communicate using additional radio-frequency communication standards including Bluetooth, GPS, and/or others. Moreover, the processor 310 may execute software code stored in the program memory 320 to control such additional functionality. For example, directional velocity and/or position estimates output from a GPS receiver may be available to any application program executing on the device 300, including various exemplary methods and/or computer-readable media according to various exemplary embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus may be implemented by any combination of hardware and software. A device or apparatus may be regarded as a device or apparatus, or as an assembly of multiple devices and/or apparatuses, whether functionally in cooperation with or independently of each other. Moreover, devices and apparatuses may be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A computer-implemented method for configuring at least one antenna array, comprising:
    receiving, for each of a plurality of direction-of-arrival candidates, and a plurality of samples corresponding to signals incident on each of a plurality of antennas;
    using a computer arrangement, computing, for each of the plurality of direction-of-arrival candidates, (i) one or more data related to an envelope of the samples, (ii) envelope statistics corresponding to at least one multipath shape factor parameter, and (iii) at least one second-order small scale fading statistic based on the at least one multipath shape factor parameter;
    using the computer arrangement, determining arrival directions of energy for the direction-of-arrival candidates based on at least one of (i) a correlation between signal levels between different ones of the antennas, (ii) a peak and an average signal level between the different ones of the antennas, (iii) an absolute angle of arrival, or (iv) a relative angle, of arrival;
    using the computer arrangement, estimating a direction of arrival of the signals incident on the antennas based on (i) the one or more computed data, and (ii) the arrival directions of energy; and
    configuring the at least one antenna array based on the direction of arrival.

2. The computer-implemented method of claim 1, further comprising, using the computer hardware arrangement, computing a cross-correlation between the envelopes of respective sets of the samples corresponding to the signals incident on each of the antennas;
    determining a minimum value of the cross-correlation between the envelopes; and
    determining a particular direction of arrival that corresponds to the minimum value.

3. The computer-implemented method of claim 1, further comprising, using the computer hardware arrangement,
    computing a cross-correlation between the envelopes of respective sets of the samples corresponding to the signals incident on each of the antennas;
    determining a maximum value of the cross-correlation between the envelopes; and
    determining particular direction of arrival that corresponds to the maximum value.

4. The computer-implemented method of claim 1, wherein each of the samples corresponds to a pilot symbol carried by the signals incident on the antennas.

5. The computer-implemented method of claim 1, wherein the at least one antenna array comprises one or more of the antennas.

6. The computer-implemented method of claim 1, wherein the configuring procedure comprises at least one of (i) configuring a spatial selectivity of the at least one antenna array, or (ii) determining at least one of a gain or a phase shift to apply to the signals received by one or more antenna elements of the at least one antenna array.

7. The computer-implemented method of claim 1, wherein the receiving procedure comprises:
    determining at least one of a gain or a phase shift corresponding to the direction of arrival for at least one of the antennas; and
    applying the at least one of the gain or the phase shift to the signal received by the at least one of the antennas while receiving the samples.

8. The computer-implemented method of claim 1, wherein the at least one second-order small scale fading statistic includes at least one of (i) a level crossing rate, (ii) an average fade duration, (iii) a spatial cross-correlation of a received voltage envelope, or (iv) a coherence distance.

9. An apparatus, comprising:
    a plurality of antennas;
    at least one antenna array;
    a computer arrangement; and
    a non-transitory, computer-readable medium comprising computer-executable instructions that, when executed by the computer arrangement, cause the apparatus to:
    receive, for each of a plurality of direction-of-arrival candidates, a plurality of samples corresponding to signals incident on each of a plurality of antennas;
    compute, for each of the plurality of direction-of-arrival candidates, (i) one or more data related to an envelope of the samples, (ii) envelope statistics corresponding to at least one multipath shape factor parameter, and (iii) at least one second-order small scale fading statistic based on the at least one multipath shape factor parameter;
    determine arrival, directions of enemy for the direction-of-arrival candidates based on at least one of (i) a correlation between signal levels between different ones of the antennas, (ii) a peak and an average signal level between the different, ones of the antennas, (iii) an absolute angle of arrival, or (iv) a relative angle of arrival;

estimate a direction of arrival of the signals incident on the antennas based on (i) the one or more computed data, and (ii) the arrival directions of energy; and configure the at least one antenna array based on the direction of arrival.

10. The apparatus of claim 9, wherein the computer-executable instructions that, when executed by the computer arrangement, cause the apparatus to:
(a) compute a cross-correlation between the envelopes of respective sets of the samples corresponding to the signals incident on each of the antennas; and
(b) estimate a particular direction of arrival to at least one of:
i. determine a minimum value of the cross-correlation between the envelopes; and
determine the particular direction of arrival that corresponds to the minimum value, or
ii. determine a maximum value of the cross-correlation between the envelopes; and
determine the particular direction of arrival that corresponds to the maximum value.

11. The apparatus of claim 9, wherein each of the plurality of samples corresponds to a pilot symbol carded by the signals incident on the antennas.

12. The apparatus of claim 9, wherein the at least one antenna array comprises one or more of the plurality of antennas.

13. The apparatus of claim 9, wherein the computer-executable instructions that, when executed by the computer arrangement, cause the apparatus to perform at least one of:
(i) the configuring procedure to configure a spatial selectivity of the at least one antenna array, or
(ii) the receiving procedure to:
determine at least one of a gain and a phase shift corresponding to the direction of arrival for at least one of the plurality of antennas; and
apply the at least one of a gain and a phase shift to the signal received by the at least one of the plurality of antennas while receiving the plurality of samples.

14. The apparatus of claim 9, wherein the computer-executable instructions that, when executed by the computer arrangement, cause the apparatus to perform the configuring procedure to determine at least one of a gain and a phase shift to apply to the signals received by one or more antenna elements comprising the at least one antenna array.

15. The apparatus of claim 9, wherein the at least one second-order small scale fading statistic includes at least one of (i) a level crossing rate, (ii) an average fade duration, (iii) a spatial cross-correlation of a received voltage envelope, or (iv) a coherence distance.

16. A non-transitory, computer-readable medium for configuring at least one antenna array, the medium comprising computer-executable instructions that when executed by a computer arrangement, cause the computer arrangement to:
receive, for each of a plurality of direction-of-arrival candidates, a plurality of samples corresponding to signals incident on each of a plurality of antennas;
compute, for each of the plurality of direction-of-arrival candidates, (i) one or more data related to an envelope of the samples, (ii) envelope statistics corresponding to at least one multipath shape factor parameter, and (iii) at least one second-order small scale fading statistic based on the at least one multipath shape factor parameter;
determine arrival directions of energy for the direction-of-arrival candidates based on at least one of (i) a correlation between signal levels between different ones of the antennas, (ii) a peak and an average signal level between the different ones of the antennas, (iii) an absolute angle of arrival, or (iv) a relative angle of arrival;
estimate a direction of arrival of the signals incident on the antennas based on (i) the one or more computed data, and (ii) the arrival directions of energy; and
configure the at least one antenna array based on the direction of arrival.

17. The computer-implemented method of dam 1, wherein the estimating of the direction of arrival of the signal is further based on at least one of (i) an orientation sensor, (ii) a position sensor, or (iii) a directional velocity sensor.

18. The computer-implemented method of claim 1, wherein the estimating of the direction of arrival of the signal is further based on feedback from a receiver of the at least one antenna array and a transmitter of the at least one antenna array.

19. The computer-readable medium of claim 16, wherein the at least one second-order small scale fading statistic includes at least one of (i) a level crossing rate, (ii) an average fade duration, (iii) a spatial cross-correlation of a received voltage envelope, or (iv) a coherence distance.

20. The computer-implemented method of claim 1, wherein the at least one multipath shape factor parameter includes an angular spread, an angular constriction, and an azimuthal direction of maximum fading.

21. The apparatus of claim 9, wherein the at least one multipath shape factor parameter includes an angular spread, an angular constriction, and an azimuthal direction of maximum fading.

22. The computer-readable medium of claim 16, wherein the at least one multipath shape factor parameter includes an angular spread, an angular constriction, and an azimuthal direction of maximum fading.

* * * * *